June 9, 1942.  I. M. STEIN ET AL  2,285,540
CONTROL SYSTEM
Filed July 1, 1939  3 Sheets-Sheet 1

INVENTORS
Irving M. Stein and
Jacob Clarence Peters
BY
Cornelius L. Ehret
ATTORNEY.

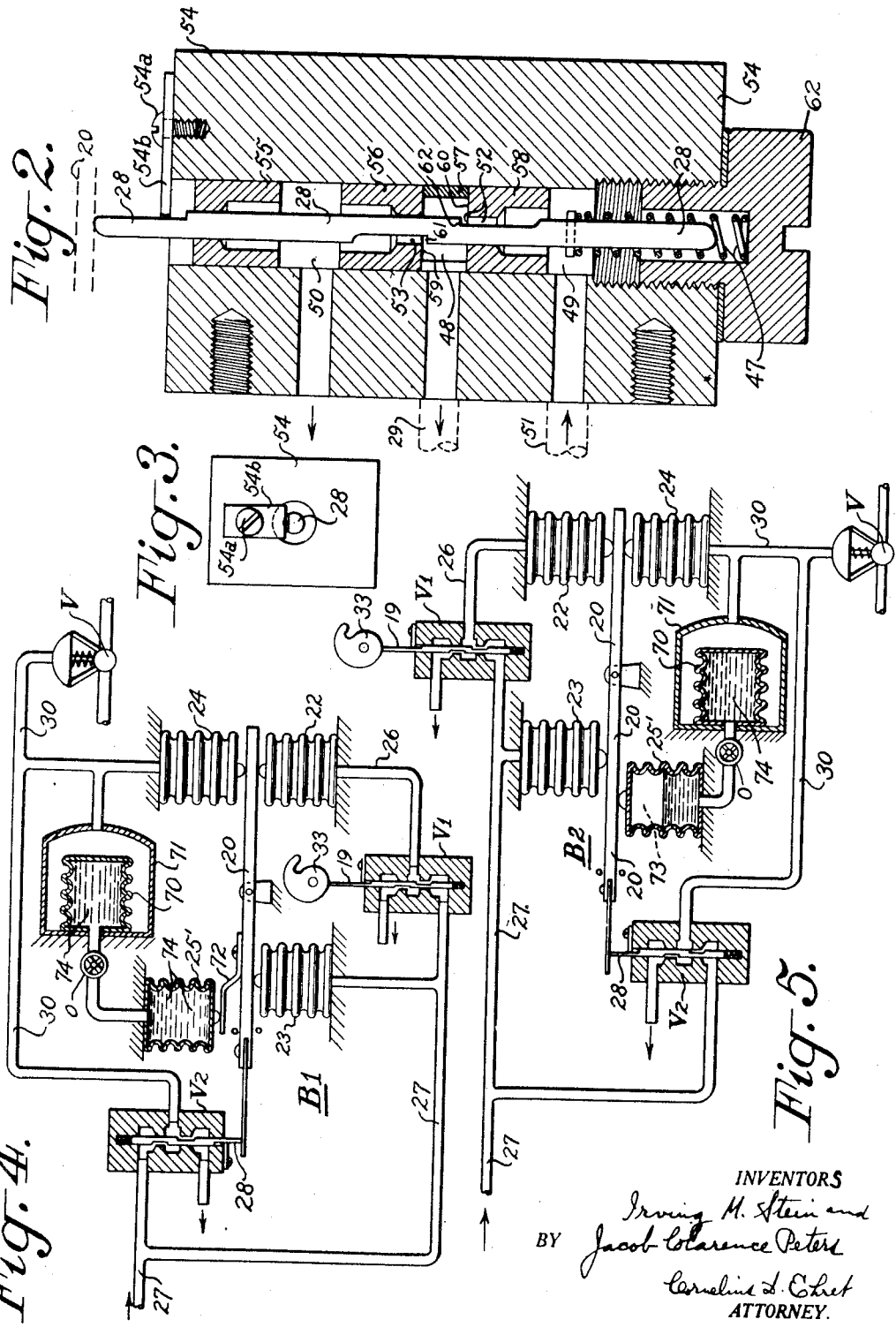

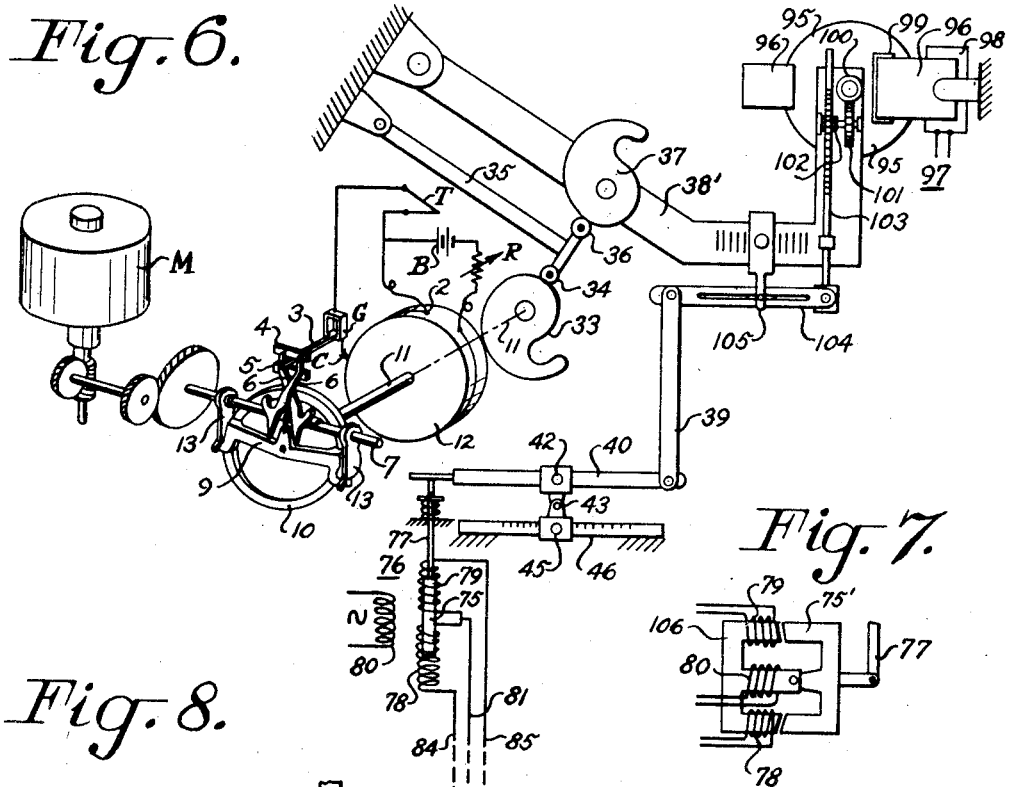
Fig. 6.
Fig. 7.
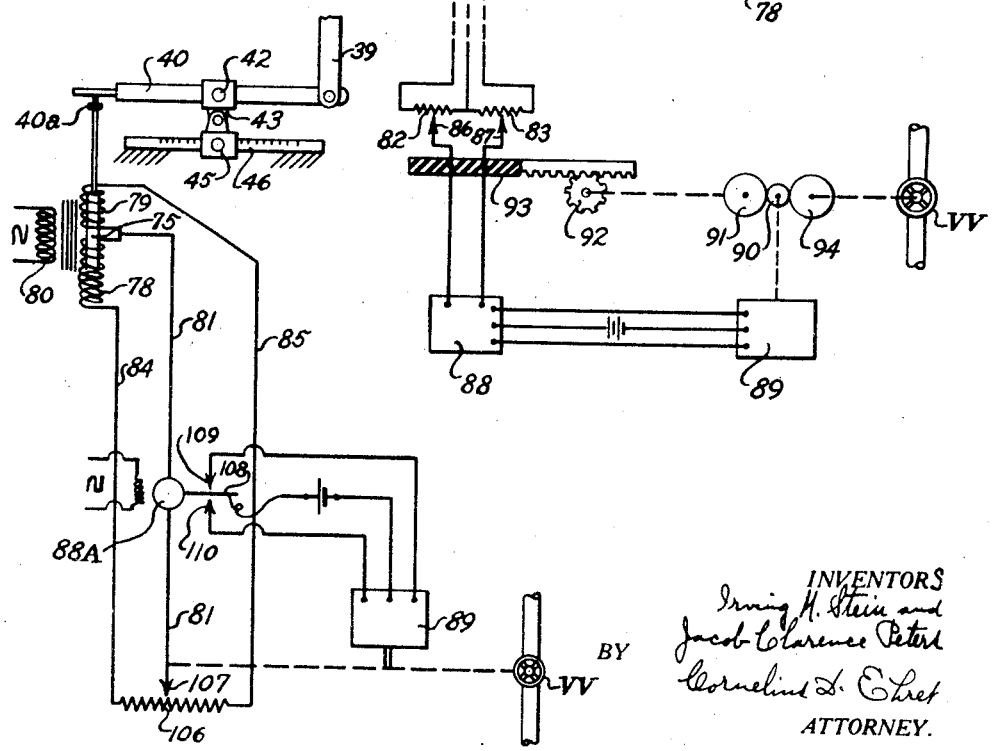
Fig. 8.

Patented June 9, 1942

2,285,540

UNITED STATES PATENT OFFICE 2,285,540

CONTROL SYSTEM

Irving M. Stein, Philadelphia, and Jacob Clarence Peters, Jenkintown, Pa., assignors to Leeds and Northrup Company, Philadelphia, Pa., a corporation of Pennsylvania Application July 1, 1939, Serial No. 282,566

6 Claims. (Cl. 236—82)

Our invention relates to systems for controlling the magnitude of a quantity or condition, as temperature, rate of flow, or other physical, chemical or electrical condition or quantity.

In accordance with our invention, between a primary control member, whose position is representative of the existing magnitude of the condition or quantity to be controlled, and a positioned member, such as a valve, rheostat, or the like, adjustable to affect the magnitude of said quantity or condition, is interposed a self-balancing system unbalanced by change in position of said primary control member and which, during rebalancing, effects adjustment of the positioned member, preferably at a rate which is a function of the deviation from normal of the magnitude of said quantity or condition and of the rate of change in magnitude of said condition or quantity.

More particularly, and in a preferred form of our invention, the self-balancing system comprises lever structure whose position determines the magnitude of a control pressure applied to the valve, or equivalent positioned member, and to which lever structure is applied, to maintain or to tend to maintain it in equilibrium, the aforesaid control pressure, a second opposed pressure of magnitude variable with change in position of aforesaid primary control member, a third pressure opposed to said control pressure and differing therefrom in magnitude by an amount substantially equal or proportional to deviation from normal of the magnitude of said condition or quantity, and a fourth pressure whose magnitude is a constant percentage of the magnitude of the second pressure for normal position of said primary control member.

Our invention further resides in the control methods and apparatus having the features and characteristics hereinafter described and claimed.

For an understanding of our invention, reference is to be had to the accompanying drawings, in which:

Fig. 1 schematically illustrates a form of the invention using a pneumatic controller for control of temperature;

Fig. 2 is a sectional view on enlarged scale of a pilot valve shown in Fig. 1;

Fig. 3 is a plan view on reduced scale of the valve of Fig. 2;

Figs. 4 and 5 illustrate modifications of a pneumatic controller shown in Fig. 1;

Figure 1:
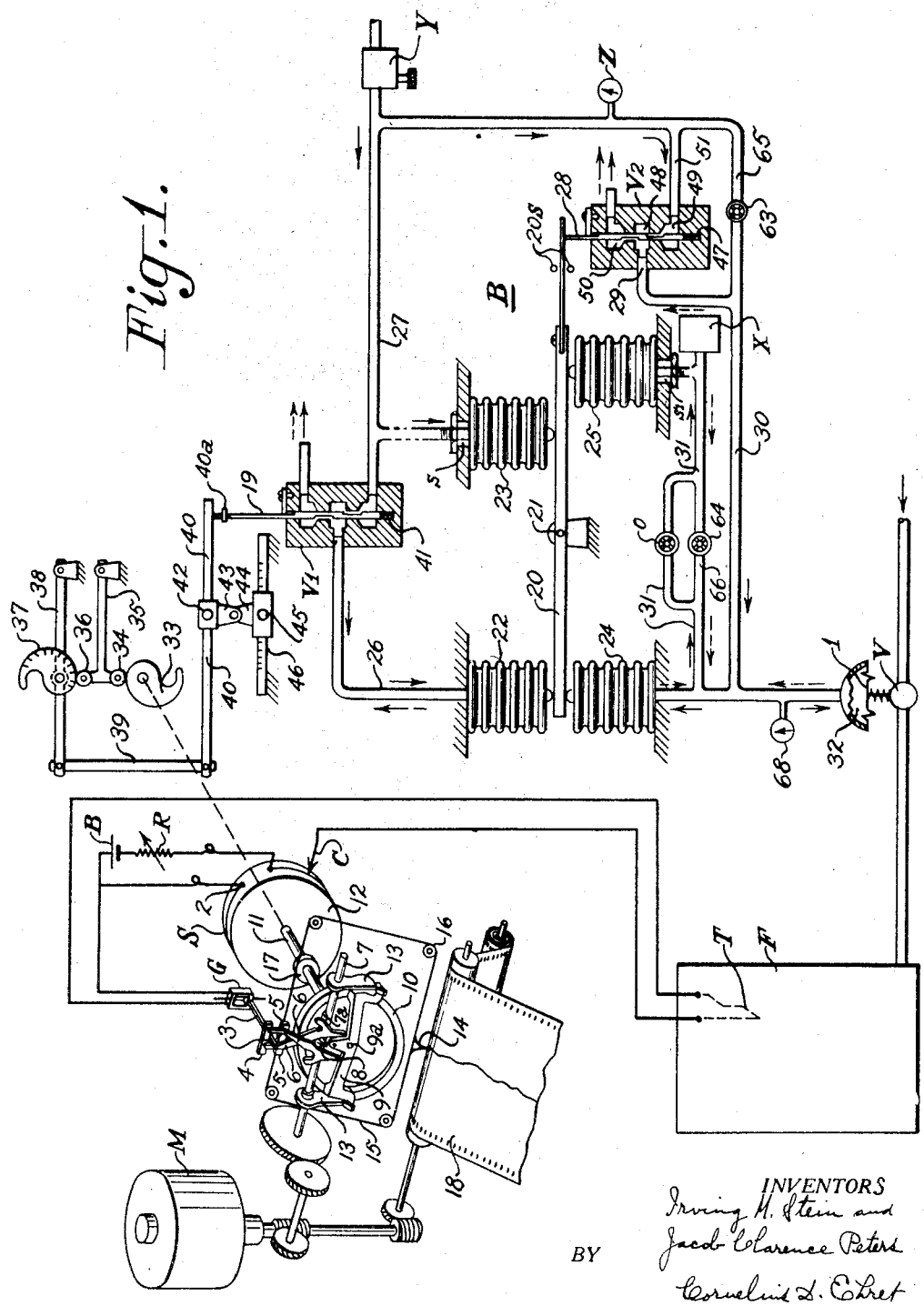

Fig. 6 schematically illustrates another form of the invention using an electrical network in replacement of the pneumatic controller of Fig. 1;

Fig. 7 shows a modification of one of the elements of the system of Fig. 6;

Fig. 8 schematically illustrates a modification of the control network of Fig. 6.

Referring to Fig. 1 as exemplary of our invention when applied for temperature control of an oil-fired furnace F, the furnace temperature is preferably measured by a self-balancing potentiometer system including a thermocouple T connected, in series with the coil G of a galvanometer, between one terminal 2 of a slidewire S and a contact C adjustable relative thereto. The slidewire current, furnished by any suitable source, for example battery B, is adjusted to predetermined value for which the slidewire is calibrated as by a resistance R; the standard cell and associated switch commonly used in setting of the slidewire current to the standard value are not shown.

Assuming there has been no change in temperature for an appreciable time, no current flows through the galvanometer G, because of balance of the thermocouple voltage and the voltage drop between the terminal 2 and contact C of the slidewire, and consequently the pointer 3 of the galvanometer is at rest in its neutral or mid-position.

Upon occurrence of a change in temperature of the furnace, the voltages become unbalanced and the pointer 3 of the galvanometer G deflects in one direction or the other when released from the clamping members 4, 5, which are periodically operated by motor M. While the pointer or needle 3 is clamped in deflected position, the feelers 6, 6, biased towards each other by a spring, not shown, are released from cam 8 on the continuously rotating shaft 7. When one of the feelers engages the end of the clamped pointer 3, it is arrested and the biasing spring between the feelers effects continued movement of the other or free feeler toward the pointer; the free feeler in moving beyond the neutral position of the pointer rocks the arm 9 about it pivot 9a, in one direction or the other, depending upon the sense of deflection of the galvanometer pointer from its neutral position and therefore upon the sense of the temperature change. During this setting movement of the arm or clutch member 9, it is free of the driven clutch disk 10 attached to shaft 11 upon which the slidewire disk 12 is mounted. Shortly after the arm or driving clutch member 9 is so displaced from its neutral position in accordance with the galvanometer deflection, it is permitted to engage clutch disk 10 under the control of cam 7a on shaft 7, and then while the clutch members 9, 10 are engaged, the arm 9 is returned, by one or the other of cams 13 on shaft 7, to its original neutral position, thus to effect adjustment of slidewire S relative to its contact C in proper sense to restore balance of the potentiometer network. This stepping action continues, if more than one step is necessary, until the thermocouple voltage is again balanced by the voltage drop between the contact C and terminal 2 of the slidewire. When these voltages are again in balance, there is no deflection of the galvanometer G, consequently, no further adjustment of the slidewire.

For a more complete explanation of the operation of the mechanical relay mechanism of the self-balancing system, reference is made to Squibb Patent No. 1,935,732.

From the foregoing brief explanation of the temperature measuring apparatus, it is to be understood that for every different furnace temperature, there is a single definite position of shaft 11 and all parts directly associated therewith including the stylus or pen 14 suitably driven from shaft 11 as by the cord 15 guided by idler pulleys 16 passing around and connected to the pulley 17 on shaft 11. The recorder chart or sheet 18 marked by the stylus 14 may be driven by any suitable constant speed device, for example, aforesaid motor M, to afford a continuous record of the furnace temperatures.

Between the potentiometer mechanism or equivalent, and the valve V adjustable to vary the rate of feed of fuel oil to furnace F, is interposed a pressure-balancing system or device B having a primary pilot valve V1 between which and the control shaft of the potentiometric measuring device is interposed a mechanical linkage (hereinafter more fully described) permitting change in the control point or "normal temperature" setting of the pilot valve and the relation between the extent of movement of the control shaft 11 and the corresponding extent of movement of the adjustable element 19 of the primary pilot valve V1. For the present, it suffices to say that the adjustable element 19 of the valve and the shaft 11 are mechanically coupled for movement in unison so that for every different temperature of furnace F there is a single definite position for valve member 19; preferably, the valve member 19 is in its mid-position when the furnace temperature is at its normal or desired magnitude.

The pressure-balancing device B, in the particular form shown in Fig. 1, comprises a rigid arm 20 pivoted at 21 intermediate its ends and two pairs of bellows 22, 23, 24, 25, or equivalent pressure devices, acting in opposition upon arm 20. The bellows 22 is connected to a suitable source of control fluid, preferably air at constant super-atmospheric pressure, through the valve V1 by the pipes 26 and 27. The position of the valve element 19 determines the pressure of the control fluid exerted by the bellows 22 upon the arm 20; specifically, as the valve member 19 is moved upwardly from the position shown, the pressure in bellows 22 is increased; conversely, as the valve 19 is moved downwardly, the pressure within the bellows 22 is decreased. A preferred construction for valve V1 is hereinafter more fully described.

The bellows 23 is connected to the supply pipe 27 on the inlet side of the primary pilot valve V1 and therefore the pressure exerted by bellows 23 on arm 20 is unaffected by the changes in position of the valve member 19. Assuming, for purposes of explanation, that it is desirable to have the pressure within bellows 22 equal to about one-half the line pressure when the temperature is normal, then the point of application of pressure by the diaphragm 23 upon the arm 20 should be at a distance from the fulcrum 21 which is one-half the distance from the fulcrum point to the point of application of pressure by bellows 22. In other words, the moments of the opposing forces exerted by bellows 22 and 23 upon arm 20 should be equal when the adjustable element 19 of the valve V1 is in that position for which the pressure in bellows 22 is, in magnitude, one-half of the pressure in bellows 23; equality of these moments, at mid-position of valve element 19 is not affected by variations of the supply pressure.

Preferably stops 20S are provided to limit the range of movement of arm 20 to correspond with the range of adjustment of valve member 28; for example, stops 20S may be so spaced the valve member 28 may be moved through a total distance of about 0.020".

Change in position of the arm 20 in response to unbalance of the forces applied thereto by the two pairs of bellows effects change in position of the adjustable element 28 of the secondary pilot valve V2 which may be of construction similar to or identical with the primary pilot valve V1. The intake side of the valve V2 is connected to a suitable source of pressure, for example, the same source or line utilized to provide the pressures within the bellows 22 and 23. The outlet 29 of the valve is connected to pipe 30 extending to the bellows 24 and to the chamber 32 above the diaphragm 1 of the fuel valve V. The bellows 25 is connected to the outlet side of the valve V2 by a pipe 31 having therein an adjustable orifice 0, enforcing slow exchange of fluid between the bellows 25 and the other elements, such as bellows 24, more directly connected to the outlet side of the secondary valve V2.

In the particular construction shown in Fig. 1, the bellows 24 is directly opposite bellows 22, and the bellows 25 engages the arm 20 on the opposite side of, and at an equal distance from the fulcrum point 21. Evidently the arm 20 is in balance, regardless of its position, whenever or so long as, the sum of the moments of the forces due to bellows 23 and 24 is equal to the sum of the moments of the forces due to bellows 22 and 25.

Assuming that arm 20 is at rest, or in equilibrium, and that the temperature is at the desired normal value, the opposing forces produced by the bellows 24 and 25 are equal, and the opposed turning moments due to the bellows 22 and 23 are equal. It is now assumed that, for one reason or another, for example increase in load, the furnace temperature falls by a fixed amount, causing the potentiometer mechanism, or equivalent, to move the adjustable element 19 of the primary pilot valve V1 upwardly to a new position and so effect increase of the pressure in the bellows 22; bellows 22 thereupon expands to effect counterclockwise movement of the arm 20 and resultant adjustment of element 28 of the secondary valve V2 until the pressure in the bellows 24, under the control of the secondary valve V2, balances the increased pressure in the bellows 22. Concurrently with increase of pressure in bellows 24, the pressure applied to the diaphragm 1 of the fuel valve is increased to increase the rate of fuel feed, until the turning moments exerted upon the arm 20 are again in equilibrium.

This type of control action causes the fluid pressure on the diaphragm of the fuel valve V to change by amounts substantially proportional to temperature changes and therefore, for brevity, is referred to as "proportional control." Assuming the movements of valve V are proportional to changes in pressure on its diaphragm, it may be said the valve moves with proportional control or at a rate which is proportional to rate of change of temperature.

Proportional control does not provide a definite normal temperature independent of load; it has a drooping load-temperature characteristic with the result a lower temperature is held following an increase in load. In order to maintain the temperature at a definite normal value regardless of load, a second type of control which may be termed a "floating control" is simultaneously provided by the device B of Fig. 1, because of the inclusion of bellows 25 and leak valve 0.

Previous to the sudden decrease in temperature assumed above, the pressures in bellows 24 and 25 were equal; immediately thereafter the pressure in bellows 24 by adjustment of pilot valve V2 was increased by an amount substantially equal to the increase in pressure in bellows 22 and representative of the deviation of temperature from the normal value. Because pressure in bellows 24 and pipe 31 is now greater than that in bellows 25, air flows through leak valve 0, (valve 64 later referred to, is and remains closed) gradually to increase the pressure in bellows 25. By the time the pressure in bellows 25 has increased by a definite amount, say, one pound, the increased force exerted by it upon balance arm 20 will have caused element 28 of pivot valve V2 to move sufficiently to cause an equal increase of pressure in bellows 24 and pipe 31. The pressure differential across leak valve 0 is thus maintained and the fuel valve V continues to move at a rate which is substantially constant for any specified deviation of temperature from the normal value; and which is different for every different deviation, increasing with increase of deviation, and decreasing with decrease of deviation. Upon return of the temperature to normal, the turning moments due to bellows 22 and 23 become equal, the pressure in bellows 24 automatically becomes the same as that in bellows 25 and the floating control action ceases.

Should the temperature suddenly increase, the pressure in bellows 22 and 24 suddenly decreases, causing a flow of air out of bellows 25 further to lower the air pressure on the diaphragm 1 of valve V and so reduce the rate of supply of fuel to the furnace.

The air capacity of bellows 25 may be augmented by additional capacity in the form of a tank $x$ (Fig. 1) to make possible larger openings of leak valve 0 for a given rate of change of pressure in bellows 25 with a given pressure differential. The valve opening may be made small for linear relation between pressure drop and flow characteristic (viscous flow conditions) or it may be made large to give square law relations, characteristic of turbulent flow conditions.

The combination of proportional and floating control actions makes it possible to maintain a controlled variable, such as temperature, at a substantially constant value, without undue oscillation due to the controller and in spite of unfavorable heat storage conditions or time lags. To suit a particular installation or set of operating conditions, the required degree of proportional control action is predetermined as hereinafter described and the leak valve 0 or equivalent is set to predetermine the speed of the floating control action independently of the intensity of the proportional control.

By providing that bars 40 and 46 be parallel when valve element 19 is in position corresponding with normal temperature, the control point remains unchanged when riders 42 and 45 are moved along the bars to vary the throttling range.

For flexibility of the control system, the mechanical connection between the adjustable element 19 of the primary control valve and the shaft 11 is preferably so constructed that different control points, corresponding in Fig. 1 with different desired furnace temperatures, may be selected without need to change the neutral or control point position of valve element 19 of valve V1, and so that the throttling range of the pilot valve V1 may be increased or decreased. The arrangement shown in Fig. 1 for accomplishing these ends comprises a cam 33 on, or driven from, shaft 11, which is continuously in engagement with cam follower 34 on arm 35 which carries a cam follower 36 in engagement with the manually adjustable cam 37 on lever 38 connected by link 39 to lever 40 against which the valve member 19 is biased as by spring 41. Preferably, an adjustable stop 40a is interposed between lever 40 and the stem of valve 19 so that with bars 40 and 46 parallel, member 19 may be set to its mid-position.

For any position of cam 33, the valve 19 may be set to the neutral position shown by suitable adjustment of cam 37 and the control apparatus will function to maintain the temperature at the magnitude corresponding with the setting of cam 37 which, for convenience, may be calibrated in degrees for temperature control, or in other units or terms suited to the particular condition to be controlled.

Lever 40 is adjustably held, as by screw 42, to the block 43 pivotally mounted upon the support 44 adjustably clamped as by screw 45 to bar 46 or equivalent. To change the throttling range, or ratio of the extent of movement of shaft 11, or equivalent, to the resultant extent of movement of member 19, the screws 42 and 45 are loosened to permit adjustment to desired extent of the fulcrum blocks 43, 44 of lever 40 and are then retightened. Adjustment of the throttling range affects both the proportional control action and the floating control action, whereas, adjustment of the orifice 0, or equivalent impedance, affects only the floating control action; adjustment of block 43 and support 44 to vary the throttling range does not change the control point.

All of the control system shown in Fig. 1, except the thermocouple and valve V, may be disposed in a common housing with the recorder mechanism thus locating the control point, throttling range, and time lag adjustments at one operating point. Alternatively, only the primary valve V1 may be disposed in the recorder casing, and the other elements of the pneumatic controller may, if desired, be disposed adjacent the valve V or in any other selected location. In either event, provision should be made to prevent the air discharged from the pilot valve or valves from disturbing the sensitive movable system of the galvanometer.

In the preceding discussion of the control action, the effect of the biasing spring 47 of valve member 28 and of the resilience of the several bellows was not included. Actually, and except for features now discussed, this spring effect modifies the control action so that, for example, upon increase of load, the temperature may be either slightly higher or lower than normal. However, if the pressure delivered by valve V2 is made to be a linear function of the motion of beam 20, this shift of the control point may be eliminated by slightly changing the position of bellows 23 along arm 20 to the point at which the unbalance of the opposed turning moments due to air pressure in bellows 22 and 23 compensates for the effect of aforesaid spring action; the bellows 25 is also mounted for adjustment lengthwise of beam 20 to make possible substantially exact compensation taking into account the spring action and slight differences in effective areas of bellows 24, 25. In Fig. 1, the provision for these adjustments is illustrated by slots S, S1 in the supports to which the bellows are adjustably clamped.

A suitable construction of valve V2 affording substantially linear relation between the position of the adjustable element and the controlled pressure is shown in Figs. 2 and 3; valve V1 may be of identical construction and is not separately described. Referring to Fig. 2, the pressure in chamber 48 is controlled by simultaneous variation in opposite sense of the size of openings between it and the chambers 49 and 50, the former connected, as by pipe 51 to the supply line 27, Fig. 1, and the latter to atmosphere or waste. Piston 28 is shown, Fig. 2, in the intermediate position for which the controlled pressure is about one-half the supply pressure. When piston 28 is moved downwardly completely to close the opening or port 52, the supply of air from line 27 to chamber 48 is cut off and, concurrently, the opening of the leak port 53 is increased thus reducing the pressure in chamber 48 to atmospheric. Conversely, when piston 28 is moved upwardly completely to close the leak port 53 and fully to open the supply port 52, the pressure in chamber 48 becomes equal to the supply line pressure. Intermediate piston positions afford intermediate pressures within chamber 48.

The valve body 54 may, for example, be a brass block approximately an inch wide, three-quarters of an inch thick, and one and five-eighths inches long having lengthwise thereof a quarter of an inch hole to receive the bushings 55, 56, 57 and 58 which define the chambers 48, 49 and 50, and provide bearings for the piston 28. The edges 59, 60 of bushings 56 and 58 and the co-operating edges 61, 62 of the cut-away portions of piston 28 should be sharp and free of burrs. In the particular valve shown, the separation between edges 59, 60 of bushings 56 and 58, as determined by bushing 57, is 0.125 inch and the distance between edges 61, 62 of the piston, as measured axially thereof, is 0.100 inch. With this construction, the relation between the position of the valve and the controlled pressure, as expressed in percentage of the supply pressure, is substantially linear for a range of movement of nearly 0.010 inch in either direction from the midpoint; increasing the length of the piston between edges 61, 62 thereof produces a greater change in the controlled pressure for a given extent of piston movement but decreases the range of linearity of the pressure-position characteristic. The preferred relation stated, assuming nominal line pressure of 18 pounds per square inch (gauge) affords practically linear variation of the controlled pressure from about 2 pounds per square inch to about 15 pounds per square inch.

It has been found that the controlled pressure for a given axial position of piston 28 varies slightly as the piston is rotated, and the extent of this pressure variation is different for different axial positions of the piston. To preclude rotation or angular movement of stem 28 or to limit the possible angular movement thereof to such small extent, for example ten degrees, that inaccuracies of control are not introduced, any suitable arrangement may be used; for example (Figs. 2 and 3), the piston 28 may be flattened for some distance near its upper end and to the upper end of the block 54 may be suitably fastened, as by screw 54a, a stop plate 54b of such length or so adjusted that it is normally out of engagement with the piston 28 or, in any event, is effective to limit the angular displacement within bounds for which the effect of such displacement upon the controlled pressure is inappreciable.

The piston 28 is urged outwardly or upwardly by the spring pressure and the air pressure; the force due to the latter in a given construction depends upon the supply pressure; in the particular example above given, this force is about two ounces. The spring 47 may in some cases be dispensed with, through use of a light spring producing a force of the order of an ounce is recommended. The spring should be so applied that the stem 28 is not biased thereby against the stop 54b, or at least not strongly so; to that end, it is helpful to wind the spring 47 in such direction it tends to wind up as the retaining cap 62 is screwed into the valve block 54 and to bend the loose end of the spring to prevent it from digging into the cap 62.

During the automatic control above described, valves 63 and 64 which bypass pilot valve V2 and orifice 0, Fig. 1, are closed. To change over for manual control of the furnace temperature, pressure-regulating device Y is adjusted to reduce the pressure read on gauge Z to equal that read on gauge 68 previous to the change. Valves 63 and 64 are then opened; to control temperature the setting of the pressure regulator Y is adjusted as may be necessary. To change from manual to automatic control, first valve 64 is closed, then valve 63 is closed, and finally pressure-regulating device Y is adjusted to give the normal supply pressure as read on gauge Z.

Although the regulator Y, which may be of any suitable type, serves greatly to minimize the effect of large, abrupt changes of pressure on the inlet side of the regulator upon the pressure in line 27, it nevertheless is not capable of maintaining the pressure in line 27 constant enough to prevent, except for provision of bellows 23, undesirable shift of the control point; regulator Y ordinarily has a slightly drooping characteristic. In the device of Fig. 1, the ratio of the pressure in bellows 23 to the pressure in bellows 22 at the control point is constant notwithstanding variations of pressure in line 27; consequently, such variations of pressure in line 27 do not affect the control point. The interposition of the regulator Y between the source of pressure and the pilot valves V1, V2 renders negligible the effect of variations of the supply pressure upon the floating control action.

The modified pressure balancing device B1, Fig. 4, is similar to the balancing device B of Fig. 1, and may replace it in the system of Fig. 1. In the device of Fig. 4, the leak valve 0, or equivalent, is in a closed hydraulic system including the bellows 25', corresponding with bellows 25 of Fig. 1, and bellows 70 disposed within a closed chamber 71 in which the pressure corresponds with the pressure in bellows 24. The spring 72, or equivalent, between bellows 25' and arm 20 is necessary because without it the device B1 would not properly respond to sudden changes in position of valve 1. The spring may be replaced by an air-cushion 73 as in the controller B2 of Fig. 5. In the controllers B1 and B2, when the pressure in bellows 24 is increased, for example, the pressure in chamber 71 is increased to act upon the bellows 70 and so force liquid 74 into bellows 25', at rate controlled by the leak 0. Conversely, when the pressure in bellows 24 is reduced, the pressure in chamber 71 is correspondingly reduced and liquid flows from bellows 25' into bellows 70. In other respects, the operation is the same as for balancing device B of Fig. 1.

The control system shown in Fig. 6, like that of Fig. 1, includes two self-balancing devices or systems, one responsive to changes in magnitude of a condition and self-balancing to maintain correspondence between the existing magnitude of the condition and the position of a control element, and the other unbalanced upon change in position of aforesaid control element and capable of rebalancing itself and concurrently to effect adjustment of a positioned member, such as a valve or rheostat, at a rate which is a function of the rate of change and of the deviation from normal of the condition under measurement.

For positioning control element 33 to correspond with the existing magnitude of a condition and for moving it in sense and extent corresponding with changes in magnitude of that condition, there may be utilized the particular combination of an electrical network and a mechanical relay previously described in connection with Fig. 1.

When control element 33 moves from one position to another, motion is transmitted to armature or core 75 of an electromagnetic device 76 through the mechanical linkage including cam follower 34, arm 35, arm 38', link 39, arm 40 and rod 77, thus in opposite sense to vary the output voltages of coils 78, 79 coupled to coil 80 which is excited from any suitable source of alternating current, for example, a 60-cycle line. The common terminal of the coils 78, 79 is connected by conductor 81 to the common terminal of two voltage-dividing resistors 82, 83 whose other terminals are connected by conductors 84, 85 to the other terminals of coils 78, 79. The contacts 86, 87, adjustable in unison with respect to the resistances 82, 83, are connected to a suitable detector 88, for example, a vacuum tube amplifier and a directional relay, or an alternating current galvanometer, effective when contacts 86, 87 are not at the some potential to effect operation of motor 89 which, through suitable mechanism diagrammatically shown as including speed-reducing gearing 90, 91, gear 92 and rack 93 effects adjustment of the contacts 86, 87 to such position that they are at the same potential. Concurrently with its adjustment of contacts 86, 87, the motor 89 through suitable mechanism, ex- emplified by gears 90 and 94, effects adjustment of valve VV in proper sense to check further departure of the condition. For each position of movable armature 75, there is a corresponding position of the contacts 86, 87 for which there is null response of the detector 88 and a corresponding position of the controlled valve VV.

As thus far described, the control action effected by valve VV is in sense to check further change in magnitude of the condition irrespective of whether it is approaching a departing from normal and, consequently, although the control is stable, it does not maintain normal magnitude of the condition, for example, furnace temperature, under varying load conditions.

To insure return to normal of the temperature, or other condition, the core 75 is not permitted to remain at rest at the end of the control action thus far described unless at that time the control element 33 is in the position corresponding with the desired temperature. The particular mechanism shown in Fig. 6 for insuring return of temperature to normal comprises a disc 95 of copper, or other suitable metal, carried by arm 38' for rotation adjacent the pole structure 96 of an electromagnetic device 97 whose field coil 98 is energized from any suitable source of alternating current, for example, a 60-cycle line. One or more shading coils 99 are provided as in more conventional types of induction-disc motors.

When arm 38' is in its neutral position corresponding with the desired temperature, the opposing torques exerted upon the armature disc 95 by the motor's field are equal, but when arm 38 is displaced from neutral, the torques are unequal and disk 25 rotates in a sense corresponding with the sense of displacement of arm 38 from neutral and at a rate increasingly higher the greater the extent of displacement from neutral. The rotation of disc 95 is utilized to move the core 75 through gears 100, 101, 102, rack 103 and link 104 which connects the rack 103 to link 39. So long as arm 38' remains displaced from the neutral position corresponding with the desired temperature, the disk 95 moves armature 75 in that sense causing adjustment of valve VV in the direction required to return the temperature to normal.

The pivot 105 for lever 104 is adjustable along its length to permit adjustment of the extent of movement of core 75 for a given extent of movement of disc 95 and so obtain the optimum rate of "deviation" or "floating" control for a particular furnace or other installation. The ratio between the extents of movement of control element 33 and core member 75 is variable by an adjustment of pivot 43 of lever 40.

With the arrangement shown in Fig. 6, the relation between the position of valve VV and the position of the plunger or core 75 is a linear one; although any desired relation may be predetermined, as by tapering of the slide-wires 82, 83 or by otherwise procuring unequal changes of resistance for successive equal extents of adjustment of contacts 86, 87.

For interchangeability of the magnetic controller of Fig. 6 for the air-actuated controller of Fig. 1, it should be designed to provide for suitably large variation of output voltage for about 0.02 inch range of movement of its core 75. A suitable construction of the inductive transmitter is shown in Fig. 7; the primary 80 is wound upon the middle leg of a stationary E-shaped core member 106 upon whose other legs are disposed the secondary coils 78, 79. The movable core member 75' operable by arm 40 is also E-shaped with its pivotal axis so positioned that angular displacement of member 75' decreases (or increases) the reluctance of the magnetic circuit linking primary coil 80 with one of the secondary coils 78, 79 and concurrently increases (or decreases) the reluctance of the magnetic circuit linking primary 80 with the other of the secondary coils.

In the modification shown in Fig. 8, the resistances 82, 83 of Fig. 6 are replaced by a single voltage-dividing resistance 106 whose adjustable contact 107 is connected to conductor 81 from the common terminal of the secondary coils 78, 79 of the inductive transmitter. The current through conductor 81 traverses the movable coil of an alternating current galvanometer 88A of the contacting type. For opposite directions of movement of armature 75, the galvanometer 88A deflects in opposite directions to effect engagement of its movable contact 108 with one or the other of contacts 109, 110 which with it serve as a reversing switch for reversible motor 89. The contact 107 is mechanically operable by motor 89 which is also coupled to the valve VV exemplary of the device to be controlled. Upon deflection of galvanometer 88A, the motor 89 moves contact 107 in such direction the current in conductor 81 is reduced and continues to run until contact 108 of the galvanometer, because of reduced deflection, interrupts the motor circuit; concurrently with adjustment of contact 107 to rebalance the electrical network, the valve VV is adjusted by motor 89 in corresponding sense.

To insure return to normal, arm 39 may, as in Fig. 6, be connected for actuation by disc 95, or equivalent member, whose movement continues until the temperature, or other controlled condition, returns to normal and at a rate which depends upon the deviation from normal.

What we claim is:

1. In a system comprising pressure-responsive means adjustable to affect the magnitude of a condition and a primary control member positioned in accordance with the existing magnitude of said condition, a secondary control member, a pair of pressure-responsive devices opposed in their effects upon said secondary control member, a source of pressure directly connected to one of said devices continuously to subject it to the pressure of said source, a valve between said source and the other of said devices controlled by said primary control member to produce unbalance of the opposed effects of said devices upon displacement of said primary control member from its normal position at which said effects are balanced irrespective of variations of the pressure of said source, a second pair of pressure-responsive devices opposed in their effects upon said secondary control member and interconnected by means delaying equalization of their pressures, and a valve movable by said secondary control member during unbalance of the effects thereon of said pairs of devices to vary the pressure applied to said pressure-responsive means and to one of the last-named pair of said devices.

2. In a system comprising pressure-responsive means adjustable to affect the magnitude of a condition and a primary control member positioned in accordance with the existing magnitude of said condition, a pivotally mounted secondary control member, a pair of pressure-responsive devices disposed to apply opposing torques to said secondary control member, means controlled by said primary control member to vary the pressure applied to one of said devices, means controlled by said secondary control member to vary the pressure applied to the other of said devices and to said pressure-responsive means, a third pressure-responsive device disposed to produce a torque in opposition to that produced by said other of said devices and to which it is connected by means providing for delayed equalization of pressure, and a fourth pressure-responsive device disposed to produce a torque in opposition to that produced by said third pressure-responsive device and to which is applied a pressure which is a constant percentage of the pressure applied to said one of said devices for normal position of said primary control member.

3. A control system comprising a pivotally mounted control member, a control valve having an adjustable element positioned by said control member, a pressure supply line, a pair of collapsible bellows for applying to said member forces tending to effect its angular displacement in opposite directions, upon one of which is continuously directly impressed the supply line pressure inherently subject to fluctuations and upon the other of which is impressed a fraction of that pressure variable as a function of the magnitude of the condition controlled by said system, a second pair of collapsible bellows for applying to said member forces tending to effect its displacement in opposite directions, interconnected by means delaying equalization of their pressures, and one of which is connected to said supply line by said valve, and means for adjusting at least one of said bellows with respect to the pivot of said control member to compensate for the effect of the resilience of the bellows upon the balanced position of said member for different pressures impressed upon said other of the first pair of bellows.

4. A control system comprising two pilot valves each having a substantially linear position-pressure characteristic, a movable member whose position corresponds with the existing magnitude of a controlled quantity or condition mechanically connected to operate one of said valves, a final control element positioned in accordance with a pressure controlled by the other of said valves, and a pressure-balance for operating said other of said valves comprising four pressure-responsive devices, two of which are on the controlled pressure side of said other of said valves, another of which is on the controlled pressure side of said one of said valves, and the other of which is on the supply side of said other of said valves.

5. A control system comprising two pilot valves each adjustable to vary a pressure derived from a supply subject to pressure fluctuations, a movable member whose position corresponds with the existing magnitude of a controlled quantity or condition mechanically connected to operate one of said valves, a final control element positioned in accordance with the pressure controlled by the other of said valves, and a pressure-balance for operating said other of said valves and whose balance is independent of said fluctuations comprising four pressure-responsive devices, two of which are on the controlled pressure side of said other of said valves and the other two of which are respectively on the supply side and controlled pressure side of said one of said valves.

6. In a system comprising a pressure-responsive means adjustable to affect the magnitude of a condition, a primary control member positioned in accordance with the existing magnitude of a condition, and a source of pressure for said means inherently subject to fluctuations, a valve between said source and pressure-responsive means, a pressure-balance for determining the position of said valve comprising a pressure-responsive device directly connected to said pressure-responsive means, a pressure-responsive device opposed to first-named pressure-responsive device and connected thereto through means providing for delayed equalization of the pressures to which said devices are subjected, a third pressure-responsive device connected to said source through a second valve positioned by said primary control member, and means for avoiding effect upon said balance of said fluctuation of pressure of said source comprising a fourth pressure-responsive device opposed to said third pressure-responsive device in their effects upon said first-named valve and continuously directly connected to said source.

IRVING M. STEIN.
JACOB CLARENCE PETERS.